G. S. SHEINKER.
BRAKING MECHANISM FOR ROAD VEHICLES.
APPLICATION FILED JUNE 28, 1919.

1,427,916.

Patented Sept. 5, 1922.

INVENTOR
George S. Sheinker
BY
Frank H. Ashley
ATTORNEY

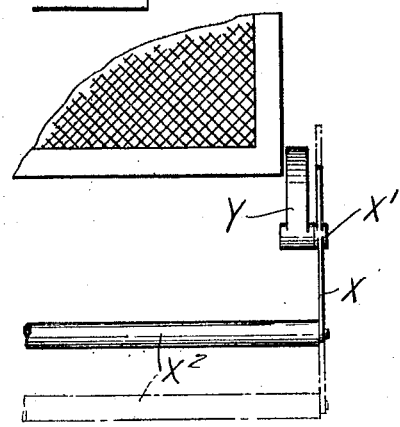
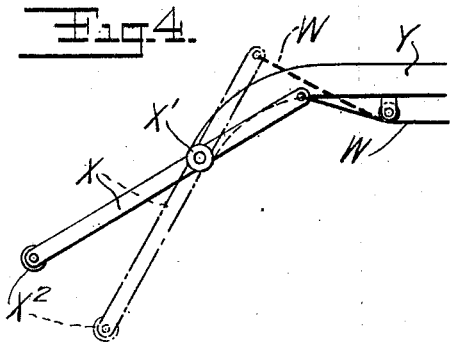
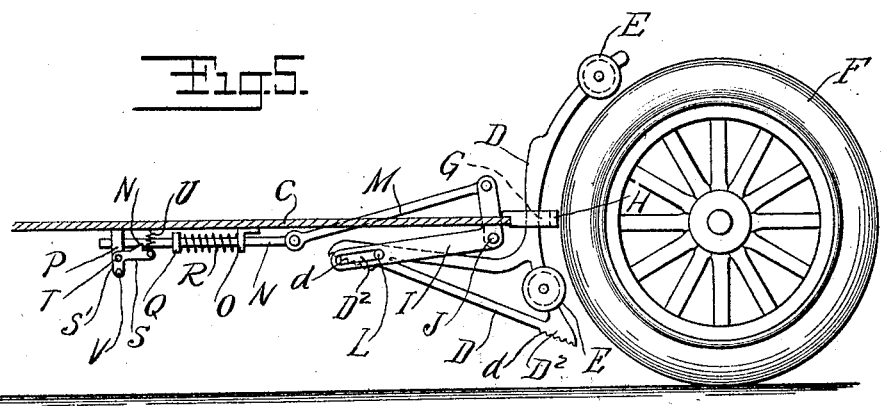

Patented Sept. 5, 1922.

1,427,916

UNITED STATES PATENT OFFICE.

GEORGE S. SHEINKER, OF NEW YORK, N. Y., ASSIGNOR OF ONE-HALF TO ALEXANDER MILLER, OF NEW YORK, N. Y.

BRAKING MECHANISM FOR ROAD VEHICLES.

Application filed June 28, 1919. Serial No. 307,430.

*To all whom it may concern:*

Be it known that GEORGE S. SHEINKER, citizen of the United States, and resident of the city of New York, in the county of Kings and State of New York, has invented certain new and useful Improvements in Braking Mechanism for Road Vehicles, of which the following is a specification.

My invention relates to brakes for vehicles and in particular to brakes used on automobiles.

The object of my invention is to provide a brake that may be operated either manually or automatically in case of sudden danger such as an obstruction being encountered in the roadway or a person stepping in front of the vehicle when in motion.

Referring to the drawings which form a part of this specification,

Fig. 3 is a fractional front view illustrating in full lines the normal position of the buffer portion and in dotted lines the set position.

Fig. 4 is a side view of the buffer portion, the dotted lines indicating the position of the parts in set position.

Fig. 5 is a side elevational view of the brake on a larger scale to more clearly show the arrangement of the several parts.

A indicates the body portion of an automobile and B the chassis on which it is mounted. C indicates a longitudinally extending portion of the frame of the car, or in some cases a special frame carried by the chassis, and on which the brake mechanism is mounted. The brake mechanism comprises two units of like construction, one of each of which is carried on each side of the vehicle in front of the driving wheels. The description of one part will therefore suffice for both, their operation being simultaneous and both being released for action by the same lever or buffer.

Figure 1:
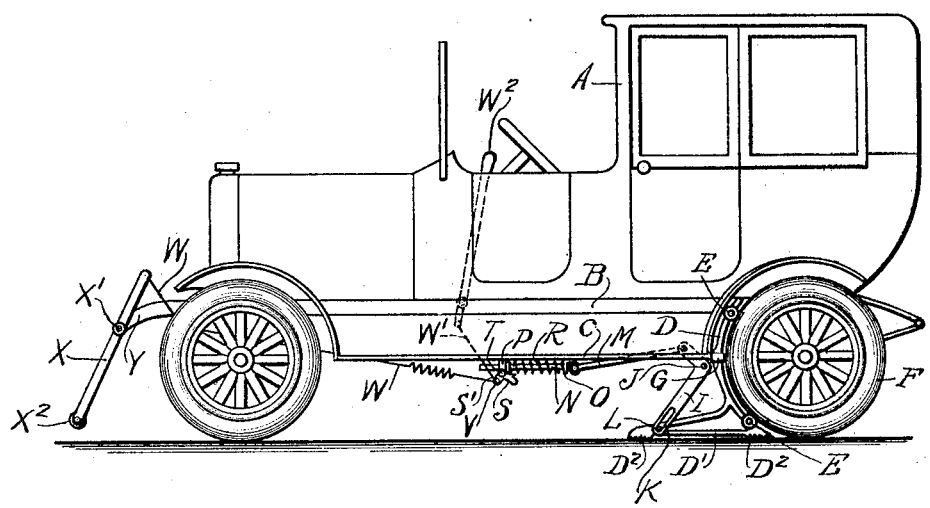
Fig. 1 is a side elevational view of an automobile equipped with my brake apparatus illustrating the relative position of the parts when the brake is in operation.
Figure 2:
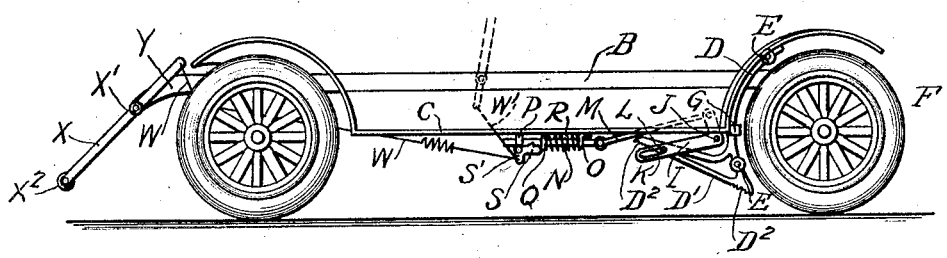
Fig. 2 is a side view of the brake in normal position as carried on the vehicle.

D indicates a metal frame the lower end of which is provided with a brake-shoe D' the parts $D^2$—$D^2$ respectively being preferably provided with laterally extending corrugations $d$—$d$ adapted to grip the surface of the roadway when the frame D is dropped in applying the brake, as illustrated in Figure 1. The frame D is provided with two rollers E—E respectively adapted to contact with the wheel F when in braking position, and is supported in a slot G formed in a casting H connected to the frame C. I, indicates a bell crank lever held to the frame C and pivoting at J, and having a slot K formed in its lower end into which the pin L carried by the frame D extends. The opposite end of the lever I is engaged by a connecting-rod M which in turn is connected to a spring actuated rod N held to the frame C by brackets O and P, each of which is provided with holes in alignment through which the rod N may slide. Mounted on the rod N is a fixed collar Q and a helical spring R which abuts the collar Q at one end and the bracket O at the opposite end and is normally held in compressed condition by a pawl S formed on one end of the bell-crank lever S' which in turn is supported by the bracket P and hinged thereto as indicated at T. The tooth of the pawl S engages a notch N' formed in the rod N and a spring U holds the pawl in engagement as illustrated. Connected at V to the bell-crank lever S' are two light strong rods or flexible wires, W and W' respectively, one of which is connected to the lower end of the manually operated lever $W^2$ and the other of which is connected to the upper end of the side lever X which forms a part of the buffer and is connected to the vehicle by a bolt at X' attached to the forward end of the spring Y as shown. Carried by the side levers X is a cross bar $X^2$ which is normally carried as illustrated in Figure 2 and may be made sufficiently wide to extend laterally to the outer sides of the forward wheels of the vehicle if desired. When the vehicle is in motion and the cross-bar $X^2$ comes in contact with any obstruction or body, it is forced downward, thus pulling the cable W which releases the pawl S from engagement with the rod N, thus permitting the spring R to act and throw the brake-shoe into braking position as illustrated in Figure 1, thus causing the wheels F to contact with the rollers E—E and force the shoe portions $d$—$d$ to firmly grip the surface of the roadway and thus immediately stop the vehicle.

In the normal carrying position the upper wheel E may rest in contact with the face of the tire F and is supported in position by the pin L and link I, since its normal action, due to gravity, would tend to throw the lower disk E into contact with the tire F if it were not held therefrom by said pin L. The mechanism is reset by manually lifting the parts into inoperative position after which the spring R is compressed and the pawl S placed in position.

If desired, the brakes may be applied by operating the lever W² manually, as will be readily understood. It is to be understood that this emergency brake is not intended to be operated when the vehicle is moving at a high rate of speed but is intended more for protection to pedestrians who carelessly step in front of a vehicle when the same is moving at a moderate rate through a crowded street or where the vehicle is started just as a person starts to cross in front of it, as often occurs.

Small details of construction have been omitted from the drawings as not necessary to a person skilled in this art and I reserve the right to change or modify the construction as same may be necessary to fit different types of vehicles, depending upon the claims forming a part of this specification to define the limitations.

Having thus described my invention, I claim as new and desire to secure by Letters Patent:—

1. A brake mechanism for road vehicles comprising a supporting frame, a brake-frame carried thereby, means for holding said brake-frame at a predetermined distance above the ground, comprising a bell-crank lever having a slot at one end and connected to said brake-frame by a pin adapted to slide in said slot, a locking mechanism controlling said brake-frame and means for automatically unlocking said lock and thus setting the brake.

2. A brake mechanism for road vehicles comprising a supporting frame, a brake-frame carrying a brake-shoe adapted to contact with the surface over which the vehicle is passing and means for releasing said brake-frame from said supporting frame, said means comprising a fender having side levers carried by said supporting frame, a locking mechanism comprising a rod and pawl, and flexible wires extending from the ends of the fender levers to said pawl.

3. A brake mechanism for road vehicles comprising a supporting frame, a brake-frame carrying a brake-shoe adapted to contact with the surface over which the vehicle is passing and means for releasing said brake-frame from said supporting frame, said means comprising a fender having side levers carried by said supporting frame, a locking mechanism comprising a rod and pawl, and flexible wires extending from the ends of the fender levers to said pawl, and a lever adapted to be manually operated also arranged to operate said pawl to release said brake-frame.

4. A brake mechanism for road vehicles comprising a supporting frame, a brake-frame carrying a brake-shoe adapted to contact with the surface over which the vehicle is passing, and means for releasing said brake-frame from said supporting frame, comprising a locking mechanism having a rod and pawl, a spring adapted to actuate said rod when the pawl is withdrawn to release said rod and suitable connections for holding the rod and brake-frame in operative relation.

5. A brake mechanism for road vehicles comprising a supporting frame, a brake-frame carrying a brake-shoe adapted to contact with the surface over which the vehicle is passing, and means for releasing said brake-frame from said supporting frame, said means comprising a locking mechanism having a rod and pawl, a spring adapted to actuate said rod when the pawl is withdrawn to release said rod and suitable connections for holding the rod and brake-frame in operative relation and means for manually operating said pawl.

6. A brake mechanism for road vehicles comprising a supporting frame, a brake-frame carrying a brake-shoe adapted to contact with the surface over which the vehicle is passing, and means for releasing said brake-frame from said supporting frame, said means comprising a locking mechanism having a rod and pawl, a spring adapted to actuate said rod when the pawl is withdrawn to release said rod and suitable connections for holding the rod and brake frame in operative relation, and means for automatically operating said pawl comprising a fender carried by said supporting frame.

Signed at New York city, in the county of New York and State of New York this 27th day of May, A. D. 1919.

GEORGE S. SHEINKER.

Witnesses:
LOUIS H. BABBIT,
MAURICE J. SAYLES.